W. R. COMINGS.

METHOD OF MANUFACTURING RECEPTACLES.

APPLICATION FILED MAY 16, 1912.

Reissued June 25, 1912.

13,433.

2 SHEETS—SHEET 1.

Inventor

William R Comings

Witnesses

Edwin L. Jewell

A. L. Mills

By Percy B. Hills

Attorney

W. R. COMINGS.

METHOD OF MANUFACTURING RECEPTACLES.

APPLICATION FILED MAY 16, 1912.

Reissued June 25, 1912.

13,433.

2 SHEETS—SHEET 2.

Inventor

William R. Comings

Witnesses

Edwin L. Jewell

A. L. Mills

By Percy B. Hills

Attorney

UNITED STATES PATENT OFFICE.

WILLIAM RIGHTER COMINGS, OF WHARNCLIFFE, WIMBLEDON PARK, ENGLAND.

METHOD OF MANUFACTURING RECEPTACLES.

13,433. Specification of Reissued Letters Patent. Reissued June 25, 1912.

Original No. 995,953, dated June 20, 1911, Serial No. 483,408. Application for reissue filed May 16, 1912. Serial No. 697,802.

*To all whom it may concern.*

Be it known that I, WILLIAM RIGHTER COMINGS, a citizen of the United States, residing at Wharncliffe, Wimbledon Park, Surrey, England, have invented new and useful Improvements in Methods of Manufacturing Receptacles, of which the following is a specification.

This invention relates to boxes or other receptacles made from cardboard, soft metal or other material capable of being spun or compressed in dies and of retaining the shapes so imparted to it.

The invention being described and illustrated as being applied in the construction of a cardboard box of circular cross section, the application of the invention to metal or to receptacles of other shapes will be obvious.

It has long since been proposed to turn both cardboard and metal over both inwardly and outwardly so as to form a bead or edging, and also to form ledges or recesses with which a separate piece may be caused to engage or be welded on suitable pressure being applied.

Figure 1:
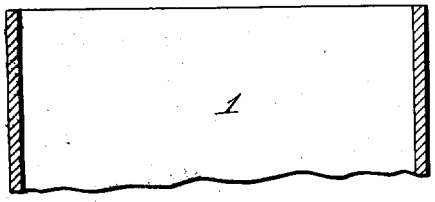
Figure 2:
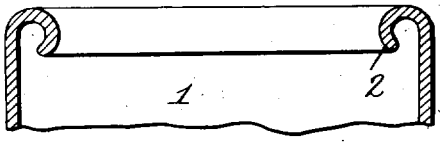
Figure 3:
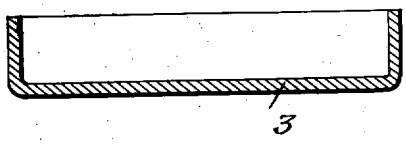
Figure 4:
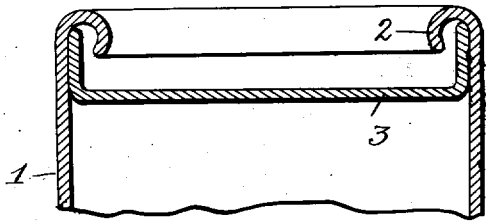
Figure 5:
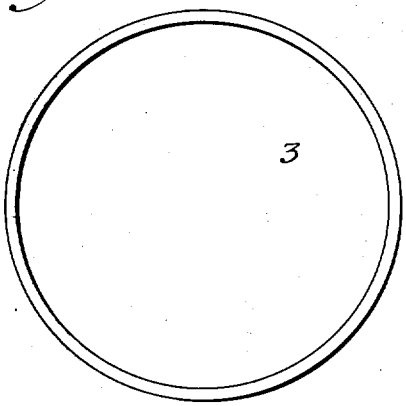
Figure 6:
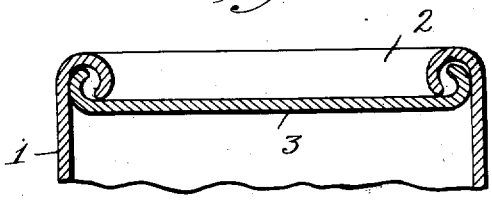
Figure 8:
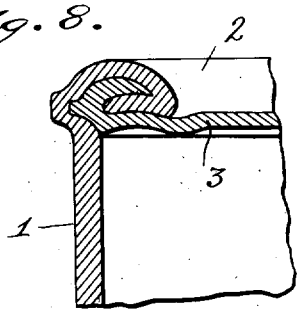
Figure 7:
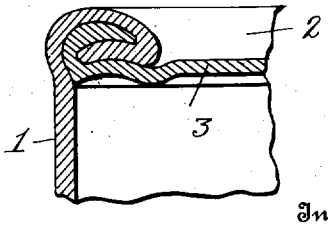
Figure 9:
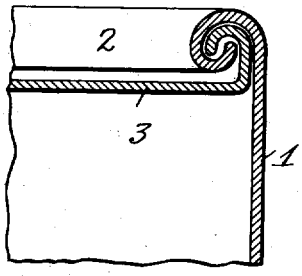
Figure 10:
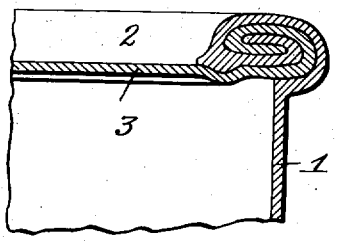
Figure 11:
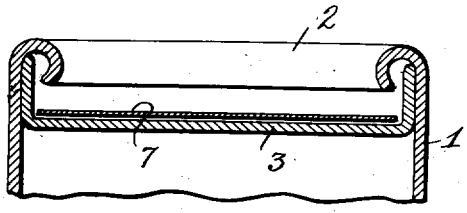
Figure 12:
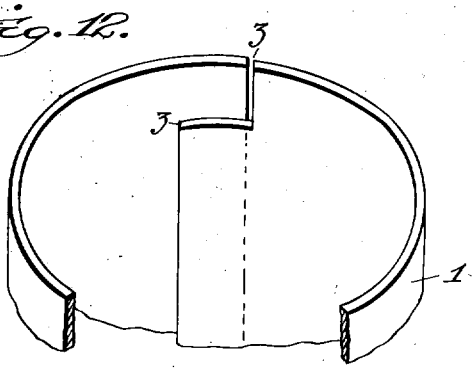
Figure 13:
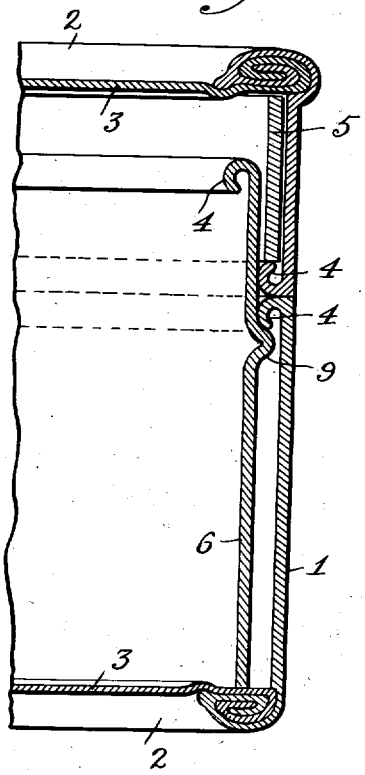

According to the present invention it is proposed to secure a more permanent and effective locking of the parts than has heretofore been customary, the invention further contemplating certain other detail improvements, such as securing an ease and elasticity of applying a lid to the box, securing the top or part commonly used for a label, and other details which will be better understood on reference to the accompanying drawings, in which:

Figure 1 represents the section of a tube which is to form the body of the box or lid, as the case may be. Fig. 2 shows the result of the first operation thereon. Fig. 3, the dish shaped piece intended to be used therewith. Fig. 4 shows such piece when being inserted into the body portion. Fig. 5, a plan of Fig. 3. Fig. 6 shows the position of the parts after the dish shaped piece has been partially forced into the body portion. Fig. 7 roughly shows the position the different parts assume after the final compression, and how the lid or dish shaped piece becomes locked with the body portion. Fig. 8, a similar view when the dies are so formed as to produce an external ring or flange. Fig. 9, a somewhat similar view to Figs. 4 and 6, except that the curve or roll of the body and of the dish shaped piece are carried somewhat farther inward. Fig. 10, a view of same when finally compressed and showing the locking of the parts together. Fig. 11, a view with a loose label on the bottom of the dish shaped piece which will carry same up and stretch and hold same in position when the parts are locked together. Fig. 12, a view of the body portion when made of lap welded tubes showing a part cut away in order that the roll inward may be on material of even thickness. Fig. 13, a section of a completed box and lid.

In said drawings the tube or body is marked 1, and, as shown in Fig. 12, if made of lap welded or glued cardboard, a section on line *z—z* may be removed so as to present an even thickness of material to be turned over or rolled inward, as indicated at 2, Figs. 2 and 4, although, if desired, a more complete roll may be made, as indicated in Fig. 9. Into the tube 1 is inserted the dish shaped piece 3, as indicated in Figs. 3, 4, 5, 9 and 11, the two parts being then compressed in suitable dies until they first assume the position shown in Fig. 6 or Fig. 9, and on further compression are caused to flow so as to approximately assume the positions indicated in Figs. 7, 8 or 10, as the case may be, thus effecting a substantial locking together of the two parts, which are then adapted for use either as a box body or a lid.

It is sometimes difficult to satisfactorily apply round labels to the tops of round boxes, but this may be easily accomplished in the present case by placing the label 7 in the dished part 3 before forcing the parts together, and in this case not only will the label be securely and centrally held without the use of paste or glue, but it may also be tightly stretched as the parts are forced together.

In Fig. 13 I have shown a completed box of preferred form, wherein I employ an inner tube 6 inserted in one of the outer tubes 1 to form therewith the body portion of the box, the upper corresponding outer tube 1 forming the lid thereof. The meeting edges of said tubes 1, as well as the upper edge of inner tube 6, are preferably rolled, as shown at 4, so as not only to stiffen the tubes, but also to present rounded and somewhat elastic fitting edges, and said tubes 1 may also carry tube sections 5.

For the purpose of securing the inner tube 6 of the box to the body portion 1, a projecting ring or bead 9 is formed, Fig. 13, so that on forcing the tube down into the box body 1, the ring or bead 9 is compelled to spring past the inner roll 4 in the box body under which it becomes firmly locked, thus securing the inner part 6 to the outer part 1, without the use of an adhesive or other attaching means.

Having now particularly described and ascertained the nature of my said invention and in what manner the same is to be performed, I declare that what I claim is:

1. The method of fixing ends or bottoms to receptacles, which consists in first forming a roll-over part upon the tubular portion of the article, next fitting to said roll-over part internally an end having a turn-up flange adapted to enter and engage said roll-over part of the tubular body, which acts as a forming die for such end, and finally applying pressure to the combined parts so as to cause the roll and the flange to turn over and flow so as to become molded together into a locking joint.

2. The method of fixing ends or bottoms to receptacles, which consists in first forming a roll-over part upon the tubular portion of the article, next fitting to said roll-over part internally an end having a turn-up flange adapted to enter and engage said roll-over part of the tubular body, which acts as a forming die for such end, and finally applying pressure to the combined parts so as to cause the roll and the flange to turn over and flow so as to become molded together into a locking joint provided with flanges adapted to strengthen the receptacle.

In testimony whereof I have signed my name to this specification in the presence of two subscribing witnesses.

WILLIAM RIGHTER COMINGS.

Witnesses:

HERBERT D. JAMESON,

O. J. WORTH.